US012760653B1

(12) United States Patent
Yochimowitz et al.

(10) Patent No.: US 12,760,653 B1
(45) Date of Patent: Oct. 13, 2026

(54) STATOR PLATFORM SEAL AUGMENTATION

(71) Applicant: RTX Corporation, Farmington, CT (US)

(72) Inventors: Jacob Kyle Yochimowitz, East Haddam, CT (US); Farruqh Shahab, East Hartford, CT (US); Andrew R. Dolan, Ellington, CT (US); Mitch Eddington Blimmel, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 26 days.

(21) Appl. No.: 19/306,151

(22) Filed: Aug. 21, 2025

(51) Int. Cl.
*F01D 11/00* (2006.01)

(52) U.S. Cl.
CPC ........ *F01D 11/006* (2013.01); *F05D 2230/23* (2013.01); *F05D 2240/55* (2013.01)

(58) Field of Classification Search
CPC . F01D 11/006; F05D 2230/23; F05D 2240/55
See application file for complete search history.

(56) References Cited

U.S. PATENT DOCUMENTS

| | | | | |
|---|---|---|---|---|
| 6,506,016 B1* | 1/2003 | Wang | F01D 11/001 | 416/193 A |
| 7,445,213 B1 | 11/2008 | Pelfrey | | |
| 7,708,520 B2 | 5/2010 | Paolillo et al. | | |
| 8,075,256 B2* | 12/2011 | Little | F01D 11/001 | 415/173.1 |
| 8,221,060 B2* | 7/2012 | Slater | F01D 11/001 | 415/173.1 |
| 8,784,045 B2 | 7/2014 | Zoric et al. | | |
| 9,057,279 B2 | 6/2015 | Lotfi et al. | | |
| 9,394,800 B2 | 7/2016 | Zheng et al. | | |
| 11,459,903 B1* | 10/2022 | Kim | F01D 11/001 | |
| 2004/0067131 A1* | 4/2004 | Joslin | F01D 5/225 | 415/191 |
| 2009/0324394 A1* | 12/2009 | Weaver | F01D 11/001 | 415/173.7 |
| 2013/0051992 A1* | 2/2013 | Diakunchak | F01D 11/001 | 415/173.7 |

(Continued)

FOREIGN PATENT DOCUMENTS

| | | | | |
|---|---|---|---|---|
| CN | 105473644 A * | 4/2016 | B60C 1/00 |
| JP | H1151200 A | 2/1999 | |

OTHER PUBLICATIONS

English Translation of Ogi et al. (CN 105473644), Apr. 6, 2016 (Year: 2025).*

*Primary Examiner* — Nathaniel E Wiehe
*Assistant Examiner* — Aye S Htay
(74) *Attorney, Agent, or Firm* — Bachman & LaPointe, P.C.

(57) ABSTRACT

A gas turbine engine stator stage has: an inner diameter platform; an outer diameter shroud; and a plurality of airfoils extending between the platform and shroud. The platform has an axially forward end and an axially aft end and an inner diameter (ID) surface. At least one of the platform forward end, aft end, and inner diameter (ID) surface bears a swirl generator for inducing swirl in a leakage flow passing radially inward behind the aft end and forward and then radially outward past the forward end.

20 Claims, 7 Drawing Sheets

(56) References Cited

U.S. PATENT DOCUMENTS

| | | | | |
|---|---|---|---|---|
| 2014/0193243 A1* | 7/2014 | Nallam | F01D 11/02 | 415/170.1 |
| 2014/0205441 A1* | 7/2014 | Lee | F01D 11/001 | 415/170.1 |
| 2015/0354391 A1* | 12/2015 | Li | F01D 11/08 | 415/173.1 |
| 2016/0017741 A1* | 1/2016 | Ebert | F01D 11/02 | 415/173.7 |
| 2017/0226882 A1* | 8/2017 | Ratzlaff | F01D 5/081 | |
| 2017/0226884 A1* | 8/2017 | Ratzlaff | F01D 11/001 | |
| 2021/0140333 A1* | 5/2021 | Whittle | F01D 5/066 | |

* cited by examiner

STATOR PLATFORM SEAL AUGMENTATION

BACKGROUND

The disclosure relates to gas turbine engines. More particularly, the disclosure relates to control of leakage through fan and compressor vane stages.

Gas turbine engines (used in propulsion and power applications and broadly inclusive of turbojets, turboprops, turbofans, turboshafts, industrial gas turbines, and the like) have axial compressor sections and sometimes fan sections wherein one or more stator vane stages are between adjacent blade stages.

From one blade stage to the next, pressure will increase along the gaspath through the fan and compressor. The blade stages are on a compressor and/or fan rotor that rotates relative to the vane stages/stator. Thus, at a given vane stage, air may tend to leak back upstream between an inner diameter (ID) platform structure of the vane stage and the rotor. For example, air may: leak radially inward from the gaspath between the trailing end of its platform and the platform or rim of the blade stage behind/downstream; pass forward between the platform and hub or spacer section of the rotor between the two blade stages; and then pass radially outward between the leading end of the vane stage platform and the trailing/aft end of the forward/upstream blade stage rim/platform back into the main gaspath.

Thus, typically a sealing system serves to seal between the spacer and the vane stage platform. Sealing structures such as labyrinth seals or abradable seals (e.g., plate seals such as knife edge seals) are provided in the art with annular plates/knife edges on the rotor and corresponding lands on the vane stage stator.

SUMMARY

One aspect of the disclosure involves a gas turbine engine comprising: a rotor having a first blade stage and a second blade stage, each blade stage having a disk; a stator having a vane stage between the first blade stage and the second blade stage and having a platform; and a sealing system having a stator section and a rotor section. The platform has an outer diameter (OD) gaspath surface from which airfoils of the vane stage extend, a forward end, an aft end, and an inner diameter (ID) surface. The sealing system rotor section comprises one or more radially outwardly protruding features on the rotor section. The sealing system stator section comprises one or more lands mounted to the platform inner diameter section. The lands have an outer diameter (OD) surface mounted to the platform and an aft surface. Each land aft surface has a concavity leading radially inward to an aftward protrusion spaced from the platform ID surface.

In a further embodiment of any of the foregoing embodiments, additionally and/or alternatively, each land is an elastomer, optionally adhered to the platform ID surface.

In a further embodiment of any of the foregoing embodiments, additionally and/or alternatively, the aftward protrusion protrudes by at least 1.0 millimeter, optionally 1.0 to 3.0 or 1.5 to 2.5; and/or the concavity has a radius of curvature of at least 1.0 millimeter, optionally 1.0 to 3.0 or 1.5 to 2.5.

In a further embodiment of any of the foregoing embodiments, additionally and/or alternatively, the stator vane stage is segmented with a plurality of segments; and each stator vane stage segment has an associated segment of the platform, an associated segment of a shroud, and at least one airfoil extending between the platform segment and the shroud segment, optionally wherein the segment is a fiber composite.

In a further embodiment of any of the foregoing embodiments, additionally and/or alternatively, each land comprises a plurality of segments respectively mounted to the platform segments.

In a further embodiment of any of the foregoing embodiments, additionally and/or alternatively, each land has a pre-formed groove axially spanning the associated radially-protruding features.

A further embodiment of any of the foregoing embodiments may additionally and/or alternatively include at least one of: a forward swirl generator mounted to a forward end of the platform; and an aft swirl generator mounted to an aft end of the platform.

A further aspect of the disclosure involves a method for manufacturing the gas turbine engine, the method comprising adhering the lands to the platform.

A further embodiment of any of the foregoing embodiments may additionally and/or alternatively include molding or extruding the lands or precursors thereof.

In a further embodiment of any of the foregoing embodiments, additionally and/or alternatively, the precursors are extruded in a quadrilateral cross-section and the concavity is machined after securing the precursors.

A further aspect of the disclosure involves a method for using the gas turbine engine, the method comprising: rotating the rotor relative to the stator to drive flow in a downstream direction from the first blade stage to the second blade stage; and a leakage flow passing radially inward between the platform and the second blade stage and then forward to be deflected by the land aft concavity to cause turbulence.

In a further embodiment of any of the foregoing embodiments, additionally and/or alternatively, the aft concavity reduces a rate of the leakage flow (e.g., a mass flow rate) relative to an absence of the concavity.

A further aspect of the disclosure involves a gas turbine engine stator stage comprising a plurality of vane segments each having an inner diameter platform, an outer diameter shroud, and one or more airfoils extending between the platform and shroud. The platforms each have an axially forward end and an axially aft end. The platforms each have a first circumferential end section and a second circumferential end section. The second end sections are received in the first end sections of adjacent platforms. At least one of: a forward swirler is mounted to the platform forward end and has a first face facing the forward end, a second face spaced forwardly of the first face, an inner diameter (ID face) and an outer diameter (OD) face, the second face having a forward and radially inward concavity; a forward swirler is mounted to the platform forward end and has a first face facing the forward end, a second face spaced forwardly of the first face, an inner diameter (ID face) and an outer diameter (OD) face, the ID face having a rearward and radially inward concavity; an aft swirler is mounted to the platform aft end and has a first face facing the aft end and second face spaced aft of the first face, an inner diameter (ID face) and an outer diameter (OD) face, the OD face having a forward and radially outward concavity; an aft swirler is mounted to the platform aft end and has a first face facing the aft end and second face spaced aft of the first face, an inner diameter (ID face) and an outer diameter (OD) face, the second face having a rearward and radially outward concavity; and an inner diameter (ID) swirler is formed as a seal land mounted to an inner diameter (ID) surface of the platform and has a first face facing the inner ID surface of the platform and second face spaced radially inward of the first face, an aft face, and a forward face, the aft face having an aftward and radially outward concavity.

In a further embodiment of any of the foregoing embodiments, additionally and/or alternatively: said at least one of a forward swirler an aft swirler, and an inner diameter (ID) swirler is adhered to the platform; and the platform is a fiber-reinforced composite (e.g., carbon fiber).

In a further embodiment of any of the foregoing embodiments, additionally and/or alternatively: the forward swirler has both said associated second face forward and radially inward concavity and ID face rearward and radially inward concavity; and the aft swirler has both said associated OD face forward and radially outward concavity and the second face rearward and radially outward concavity.

A further aspect of the disclosure involves a method for using the gas turbine engine stator stage, the method comprising: rotating the rotor relative to a stator to drive flow in a downstream direction from a first blade stage to a second blade stage; and a leakage flow passing radially inward between the platforms and the second blade stage and then forward to be deflected by at least one said concavity to cause turbulence.

A further aspect of the disclosure involves a gas turbine engine stator stage comprising: an inner diameter platform; an outer diameter shroud; and a plurality of airfoils extending between the platform and shroud. The platform has an axially forward end and an axially aft end and an inner diameter (ID) surface. At least one of the platform forward end, aft end, and inner diameter (ID) surface bears means for inducing swirl in a leakage flow passing radially inward behind the aft end and forward and then radially outward past the forward end.

In a further embodiment of any of the foregoing embodiments, additionally and/or alternatively, the gas turbine engine stator stage comprises said means on each of the platform forward end, aft end, and inner diameter (ID) surface.

In a further embodiment of any of the foregoing embodiments, additionally and/or alternatively, the gas turbine engine stator stage comprises said means on the platform inner diameter (ID) surface and wherein the means are integrated with a seal land.

In a further embodiment of any of the foregoing embodiments, additionally and/or alternatively, said means comprises a circumferential array of segments secured to a substrate of the platform.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
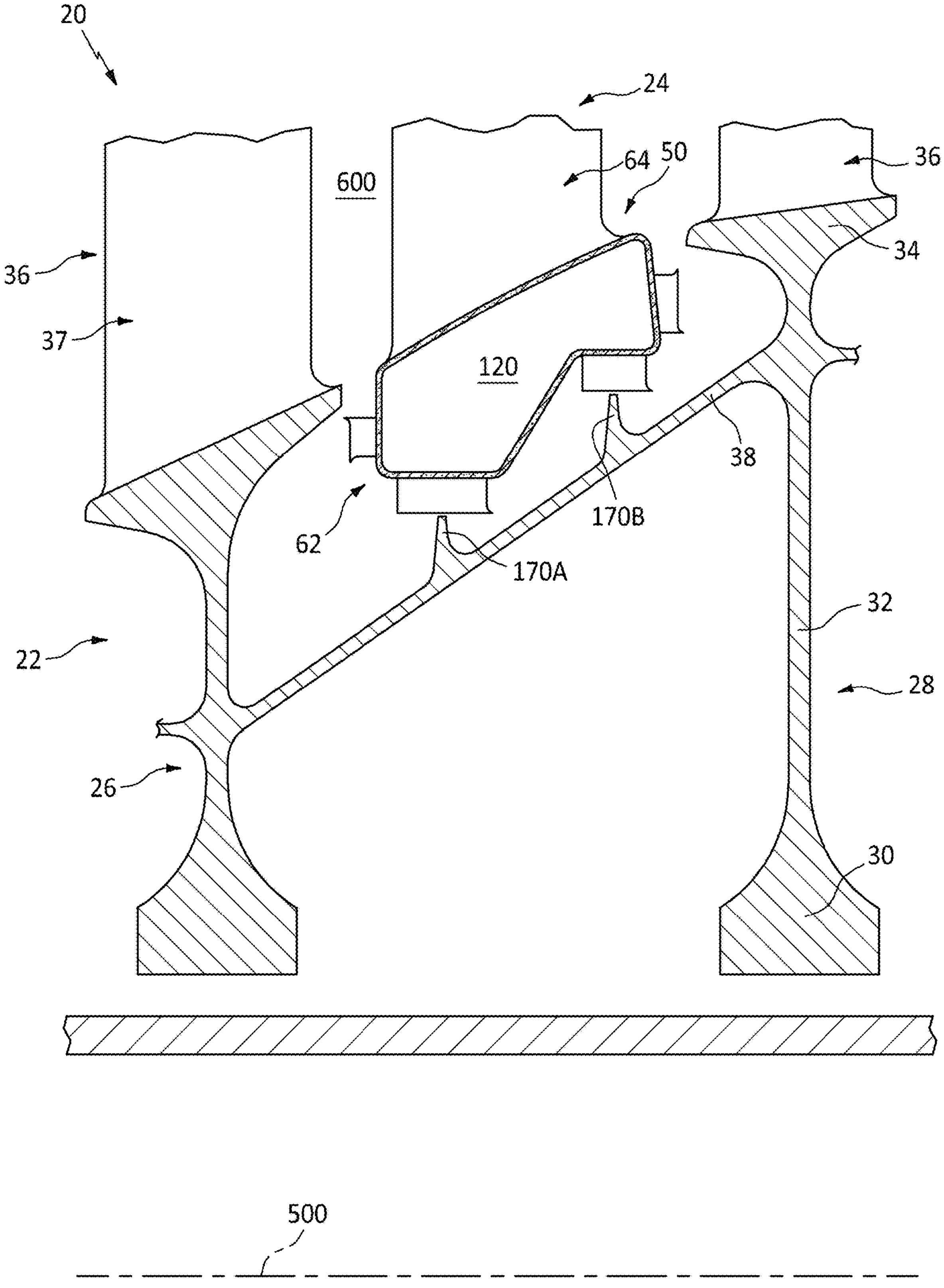
FIG. 1 is a partial central longitudinal sectional view of the compressor section of a gas turbine engine.

FIG. 1 is a partial schematic sectional view of a gas turbine engine 20 wherein a rotor 22 is interfacing with a stator 24. An engine centerline/rotor axis is shown as 500. The example section of the rotor shown has a first disk 26 and a second disk 28 each extending radially outward from an associated central protuberant bore 30 through a web 32 to a blade platform/rim section 34 and to a circumferential array (stage) of blades 36. The blades have airfoils 37 each having a leading edge, a trailing edge, a pressure side, and a suction side. The blades may extend radially outward to a distal tip or to a tip shroud. There may be multiple additional blade stages forward and aft of the example two shown in a given rotor 22. In the illustrated example, the two adjacent disk webs 32 are joined by a spacer or hub structure 38.

Figure 2:
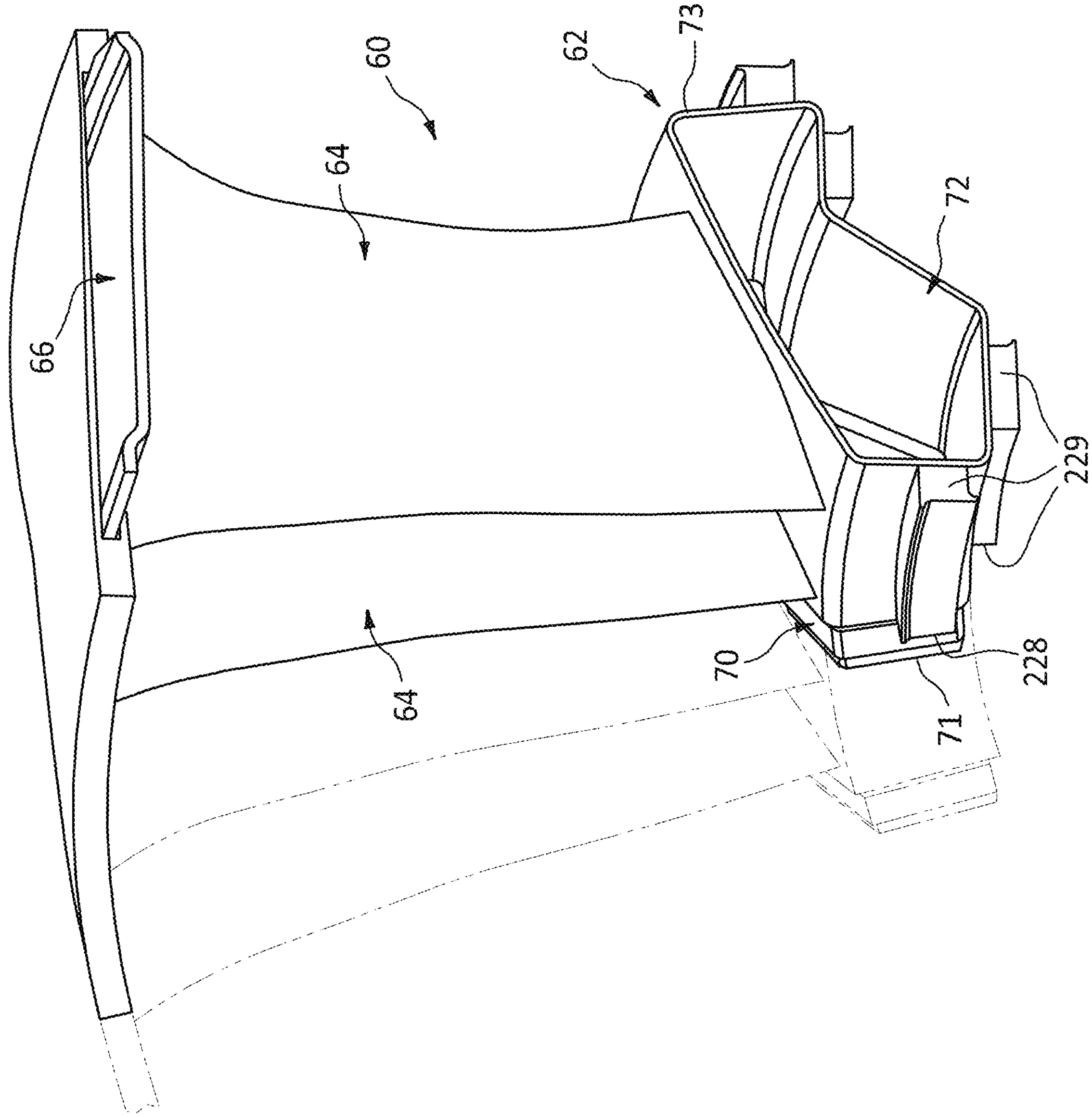
FIG. 2 is a partial view of a stator segment and case segment engagement of the compressor section.

Similarly, FIG. 1 shows a single stator stage 50. As is discussed further below, the stator stage may represent a circumferential assembly of individual segments 60 (FIG. 2) as vanes (singlets) or vane clusters (e.g., doublets (shown) or triplets typically). Example stator/vane segments are carbon fiber composite structures extending radially outward from a hollow box-structured inboard or inner diameter (ID) platform segment 62. Alternative materials are metallic alloys. The stator segment has one or more airfoils 64 as each having a leading edge, a trailing edge, a pressure side, and a suction side and extending radially outward from the platform segment 62 to an outer diameter (OD) shroud segment 66.

The platform segments 62 may mechanically interfit with each other (e.g., a necked first circumferential end section 70 extending circumferentially inward from a first circumferential end or rim 71 of each segment is received in the adjacent second circumferential end portion 72 of the adjacent segment extending circumferentially inward from a second circumferential end 73) to form a platform ring. In distinction, the example shroud segments may not so mate. Instead, the shroud segments 66 (FIG. 3) may be formed as non-hollow structures that slide into slots 80 in an engine case 82. Thus, for each stage of vanes, a circumferential slot 80 in the case 82 accommodates the associated shroud segments end-to-end in contact of closely facing. Typically, the case 82 itself may be segmented such as into 180° segments secured to each other such as at longitudinal bolt flanges.

Figure 3:
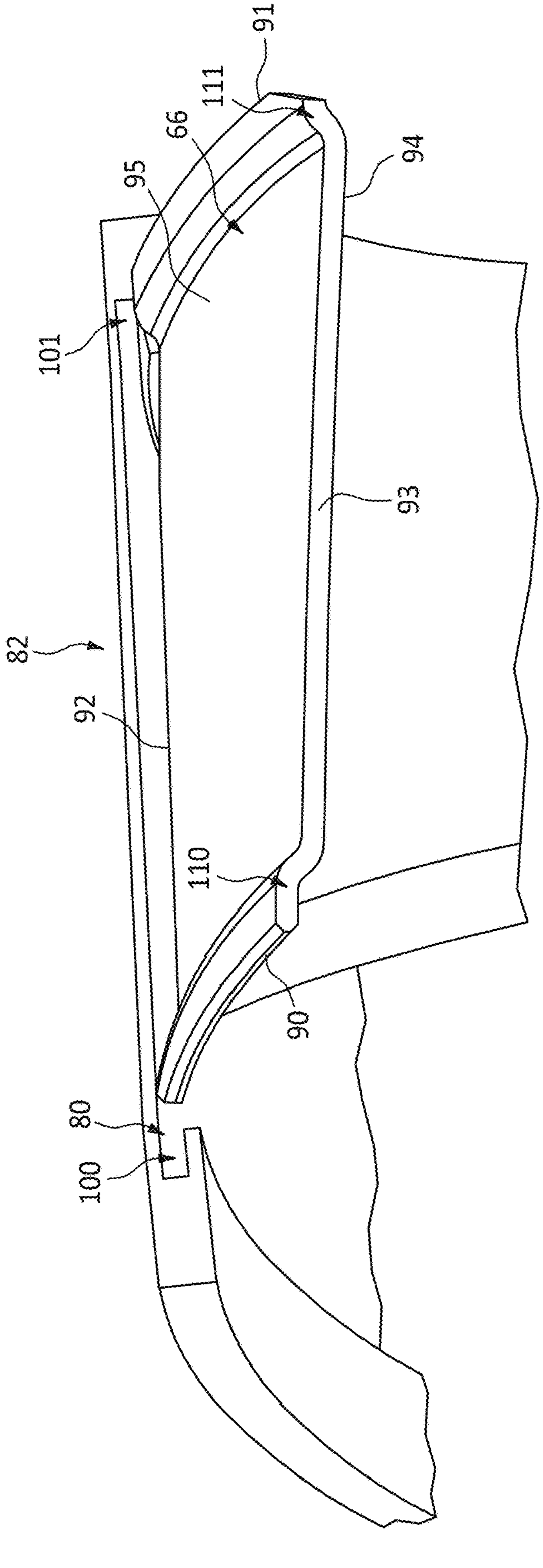
FIG. 3 is a partially exploded view of the stator segment and case segment engagement of FIG. 2.

In the illustrated FIG. 3 example, each shroud segment has a forward end 90, an aft/rear end 91, a first circumferential end 92, and a second circumferential end 93 along with an inner diameter (ID) surface 94 and an outer diameter (OD) surface 95. Respective forward and aft portions 110, 111 of the shroud are stepped outward to be accommodated in respective forward and aft channel sections 100 and 101 of the slot 80.

The case 82 may extend axially for more than one stage of the vanes and thus with respective slots 80 for respective stages. The case 82 and the shroud segments 66 form the outer diameter (OD) boundary of the local flowpath. Depending upon implementation, this flowpath may be a core flowpath (for a stage of a pure compressor section) or may be a combined flowpath (for a stage of a fan upstream of a split between the core flowpath and the bypass flowpath).

For purposes of discussion, the assembled platform segments of individual stator segments may be termed the platform of the associated vane stage and the combined shroud segments may be termed the shroud of the vane stage.

The example rotor is a compressor rotor wherein pressure along the gaspath 600 progressively increases from upstream to downstream (fore to aft (left to right in FIG. 1)). Accordingly, this provides the opportunity for leakage from downstream to upstream through spaces between the vane stage platforms 62 and the disk rims 34. FIG. 1 shows each platform 62 and their resulting combination as having a box-like structure with a hollow interior 120. The box-like structure has an outer diameter (OD) wall 130 (FIG. 1A) and a stepped inner diameter (ID) wall 132. A respective forward wall 134 and an aft wall 136 join the OD and ID walls. The ID wall itself has a generally axially extending forward segment 140 and a generally axially oriented aft segment 142 shifted radially outward therefrom so that an intermediate segment 144 extends outward and aft from the forward segment to the aft segment. There are rounded transitions 150, 151, 152, 153, 154, 155 between the segments of this box-like structure.

Due to a pressure increase from fore to aft, there may be leakage flows from the gaspath. One example leakage flowpath 620 is through a gap 160 between the platform aft end at segment 136 and the forward end/rim 180 of the band 34 of the disk 28. The leakage flow may pass radially inward and then inboard of the platform and finally pass radially outward through a gap 162 between the forward end of the platform and the aft end 182 of the band/rim of the disk 126.

Thus, at a given vane stage, air may: leak between the trailing end of its platform and the platform or rim of the blade stage behind/downstream; pass radially inward; pass forward between the platform and hub or spacer 38; and then pass radially outward between the leading end of the platform and the forward/upstream blade stage rim/platform back into the main gaspath. Thus, typically a sealing system serves to seal between the spacer and the vane stage platform. Sealing structures such as labyrinth seals or abradable seals (e.g., plate seals such as knife edge seals) are provided in the art.

Historically, to mitigate such leakage, a sealing system is provided which may include a rotor component in the form of plates/knife edges 170A, 170B (FIG. 1A) extending radially outward from the spacer/hub 38 and contacting or closely facing lands 200A, 200B on the platform. Knife edge seals are a form of plate seal with a sharpened rim. Example lands are elastomeric pads adhered to the inner diameter (ID) surface of the platform. The example ID surface of the platform is formed by the exterior surface of the box structure of the platform segments along the ID wall 132. In the illustrated example, it is along the generally axial portions 140, 142 radially and axially spaced from each other. With the example segmented platform, the example lands are correspondingly segmented (circumferential ends 228 and 229 in FIG. 3) so that land segments abut or closely face circumferential end to circumferential end. Smal static end-to-end gaps may accommodate dynamic movement, differential thermal expansion, and the like.

As is discussed further below, to assist in sealing, the present disclosure provides that additional flow redirection means (discouragers/swirl generators (swirlers)) may be added and may operate in conjunction with a conventional sealing system and/or may represent a modification of a conventional sealing system. The flow redirection may create swirling vortices and turbulence in the leakage flow which helps limit the amount/rate of leakage. Turbulence prevents laminar flow. Laminar flow is the most efficient form of air flow. Inefficiency yields less air flow rate traveling the path. The discouragers may be: integrated with the lands 200A, 200B; and/or formed as separate components.

Figure 1A:
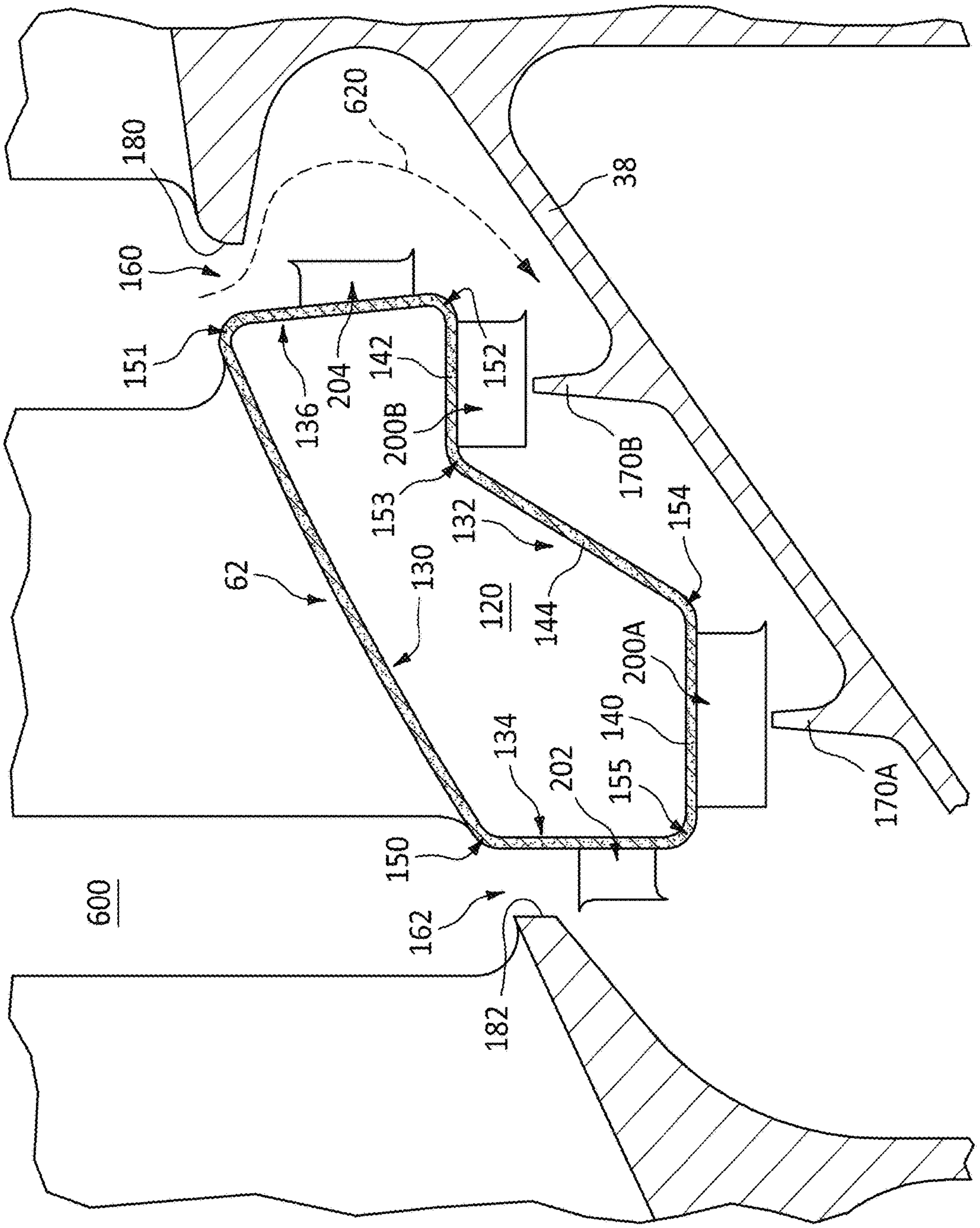
FIG. 1A is an enlarged view of the compressor section.

FIG. 1A shows the addition of forward and aft discouragers/swirl generators 202, 204 to the forward and aft ends of the stator platform. FIG. 1 also shows modification of the seal lands 200A, 200B to add swirl generation features. As is discussed further below, both the added swirl generators and the added swirl generation features of the lands may work similarly to redirect flow and generate seal/sealing effect reducing the total leakage flow along the leakage flowpath 620 relative to a baseline lacking the added discouragers/swirl generators and lacking the added swirl generation features of the lands. In the illustrated example of added swirl generators 202, 204, the swirl generators are formed by separate pieces attached to an otherwise conventional baseline vane stage platform. With the platform being segmented, the swirl generators may be similarly segmented (circumferential ends 228 and 229 in FIG. 3). Thus, a discourager/swirl generator segment attach to one platform segment may have circumferential ends contacting or closely facing adjacent circumferential ends of the corresponding discouragers/swirl generators of the adjacent two platform segments.

In various implementations, such accessory application of swirl generators may have one or more advantages. First, is that it limits any interference with manufacture. In one example, if secured by adhesive, there may be no need to change any aspect of manufacture of the vane segments. If secured by riveting, only a minor additional hole drilling step might be required. Additionally, some vane segment manufacture techniques may be inefficient for adding the volume associated with the swirl generators. For example, adding the swirl generator might require an excessively complex (convoluted shape) forming of a hollow composite stator platform and might compromise structural integrity. Or, for a metallic platform, the amount of material added might be excessive in weight. Example swirl generators or their segments may be molded of a polymeric material such as a high durometer elastomer. An example durometer value is Shore A 60-80 (more broadly 50 to 95), example elastomer is synthetic rubber. This may have the advantage of being easy to manufacture and attach. As discussed below, an extrusion manufacture of such a material may allow its bending to conform to the needed radius of curvature about the engine centerline. Also, if portions should liberate, there is low risk of any damage to downstream components in the engine (e.g., vs. use of metal). Also, use on the pure swirl generators may share a manufacture infrastructure with the seal lands. Alternatives may be natural rubber or other synthetic elastomers (e.g., silicone). Examples are non-foam, but alternatives could be foam such as a polyimide foam. Alternatives may be composites or metals. These may be pre-formed with the needed radius of curvature (e.g., molding for a composite).

In example variations, with a metallic platform, the discouragers/swirl generators and lands may be riveted to the platform. Retrofit may involve drilling rivet holes into such platform. Other fasteners such as clips may be used. Also, the discouragers/swirl generators and lands may be formed with a static end-to-end gap such as to accommodate differential thermal expansion.

The example illustrated land modification modifies the configuration of the land itself (i.e., it is a new piece molded in a different shape than the baseline). Alternative examples may involve securing an additional element to a baseline land.

In axial cross-section, each example swirl generator/land 200A, 200B, 202, 204 is formed as a non-hollow modified quadrilateral. Illustrated FIG. 1A examples have slightly different proportions and/or sizes from each other. As is discussed further below, the discouragers/swirl generators 202, 204 have two swirl generation features apiece; whereas, the lands 200A, 200B each have a single swirl generation feature. Each of the lands and the discouragers/swirl generators has four basic sides as noted above in central axial/radial cross-section and two circumferential ends. In said cross-section, these sides include an attachment side or face 210 (FIG. 1B) for bonding to the associated platform surface; and a second side or face 211 (for the lands) or 212 (for the discouragers/swirl generators) generally opposite. With reference to a general flow direction of the leakage flowpath 620, each has an upstream end/face 214 and a downstream end/face 216. In the example, at two sequential junctions of the sides of the modified quadrilateral, the cross-section is modified so that from upstream to downstream on the leakage flowpath (high pressure to low pressure) there is a concave transition 220 (FIGS. 1C and 1D) of an upstream face 214 of the quadrilateral to the adjacent face 212 redirecting flow away from the swirl generator. This creates a relatively sharp transition between the two sides of the quadrilateral of much smaller angle. This also creates a ramping protrusion 224 of height $H_P$. An example radius of curvature of the concavity 220 is 5.0 millimeters, optionally 1.0 to 7.0. In retrofit, space considerations may limit to the lower end such as 1.0 to 3.0 millimeters or 1.5 to 2.5 millimeters. In a clean sheet design of the stator (or at least a redesign of the platform) where more space becomes available, the higher end of the range may be desirable such as 4.0 to 7.0 millimeters or 4.0 to 6.0 millimeters may be preferable. Such radius may exist over at least an example half of the turn or at least an example 45° of turn. An example height $H_P$ is 1.0 millimeter, optionally 1.0 to 3.0 or 1.5 to 2.5.

Figure 1B:
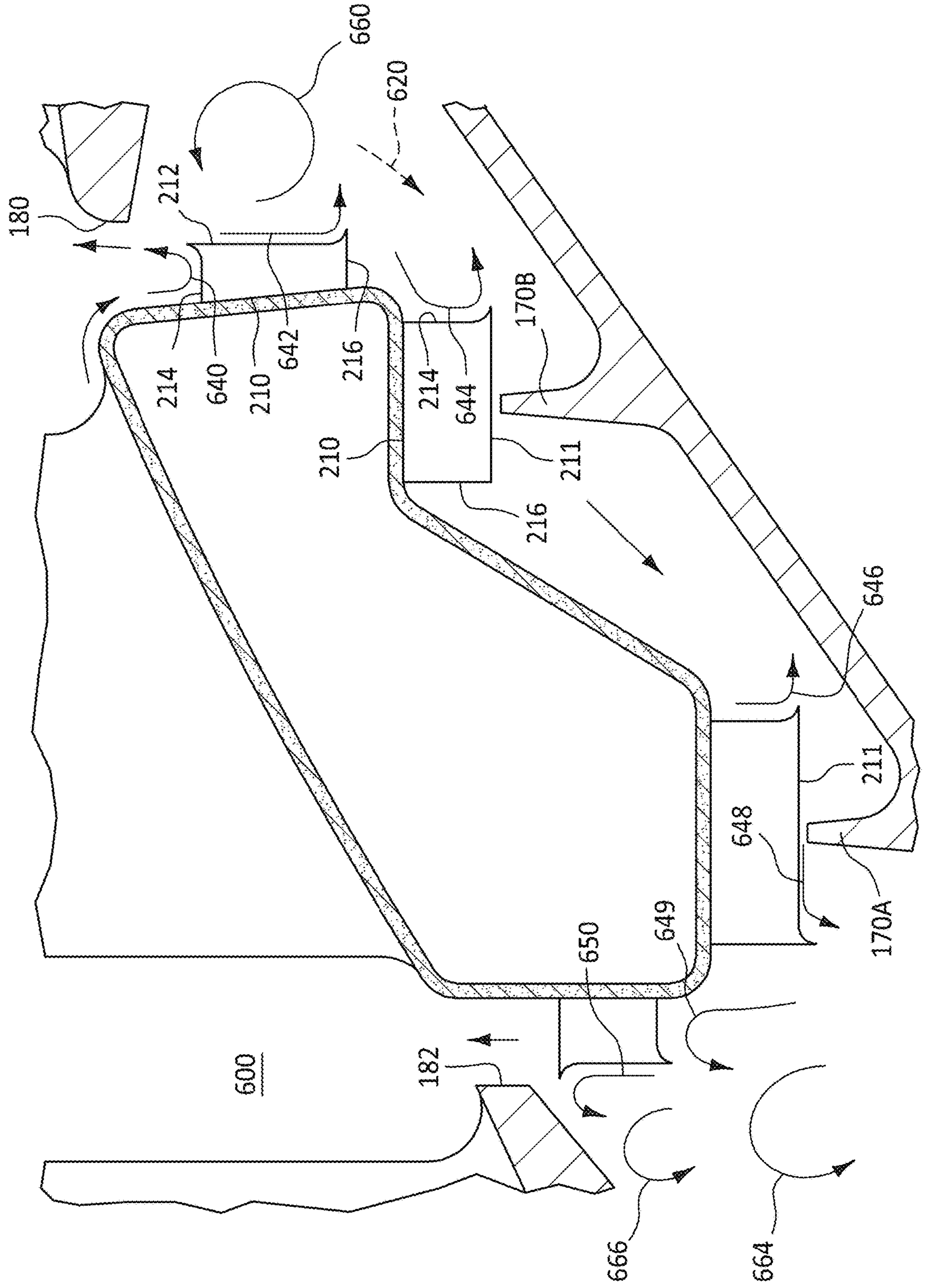
FIG. 1B is a further enlarged view of the compressor section.
Figure 1D:
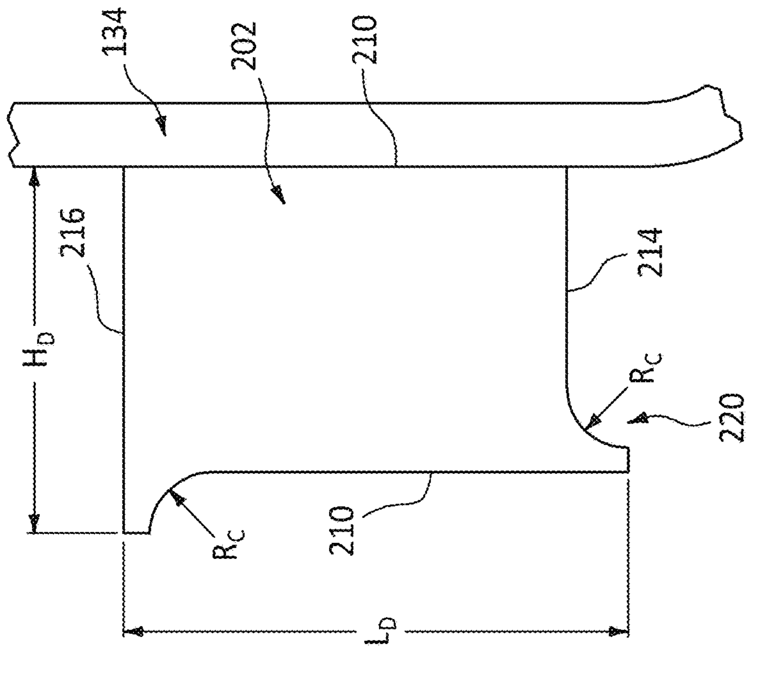
FIG. 1D is a further enlarged view of a second swirl generator in the compressor section.
Figure 1C:
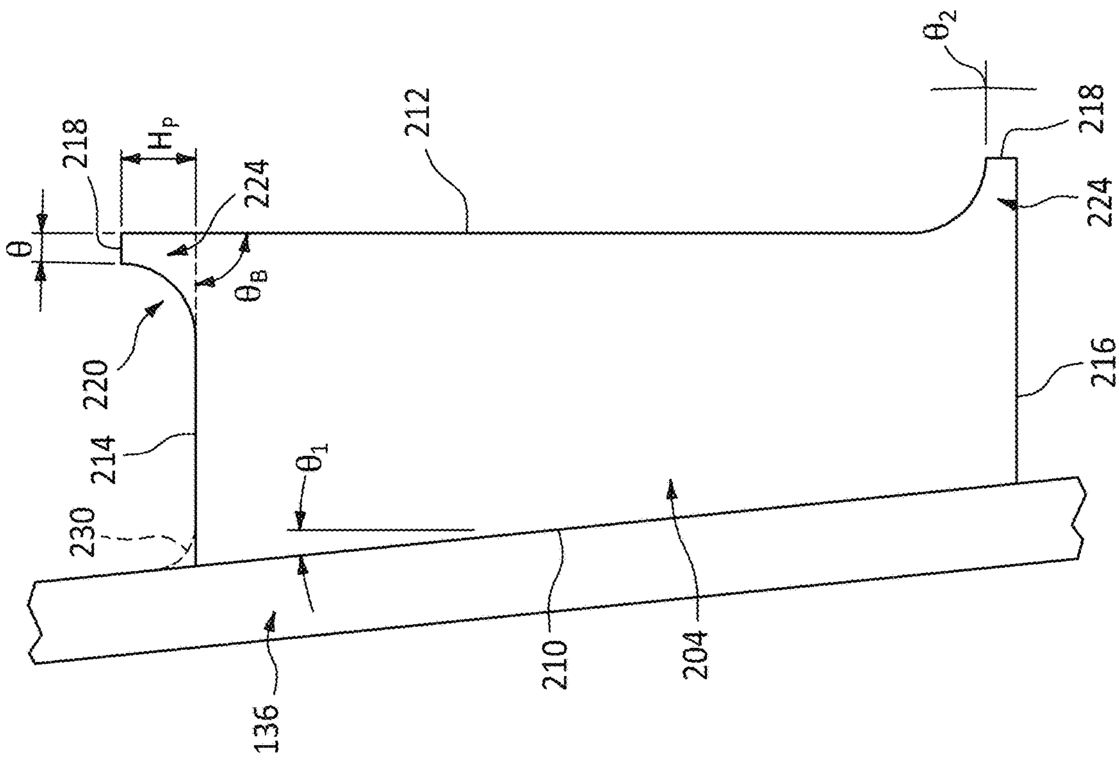
FIG. 1C is a further enlarged view of a swirl generator in the compressor section.

In an example contrast between FIGS. 1C and 1D, the cross-sectional shape of the discourager/swirl generator may be used to compensate for angling of the adjacent wall segment of the platform. FIG. 1C shows platform wall segment (thus also the discourager/swirl generator face 210) at an angle $\theta_1$ off radial. However, the generally flat portion of the surface/face 212 is essentially radial. Thus, the flat portions of the surfaces 210 and 212 of the discourager/swirl generator 204 are off parallel to each other by a compensatory angle $\theta_1$. In contrast, the FIG. 1D flat portions of the surfaces 210, 212 of the discourager/swirl generator 202 are parallel to each other and are orthogonal to the flat portions of the surfaces 214, 216. FIG. 1D also shows an overall discourager height (away from the mounting surface) of $H_D$ and an overall length transverse thereto of $L_D$. A height at the leading face (along the leakage flowpath) is $H_L$. Example $H_D$ is about 10 millimeters (more broadly 5.0 millimeters to 20.0 millimeters). Example $L_D$ is about 16 millimeters (more broadly 8.0 millimeters to 30.0 millimeters). Example $H_D$ is about 9 millimeters (more broadly 5.0 millimeters to 20.0 millimeters). The particular relation ship of these dimensions will depend on the orientation and cross-sectional length of the face to which the discourager is mounted along with clearance to adjacent components.

FIG. 1C shows the concavity extending to a terminus at a blunt end 218 of the concavity and the straight portion of the cross-section of the side 212 being at essentially zero angle θ. This is distinguished from the angle $\theta_B$ between the straight portions of the sides 214 and 212 of close to 90°. Thus, the modified quadrilateral cross-section includes a first face which is a mounting face secured essentially flat against the adjacent face of the stator. A leading second face along the leakage flowpath extends from a junction with the first face to said concave ramping transition to the third face. A leading section of the third face is relatively flat from the junction but then, itself, has a terminal concave transition similarly joining the fourth face (downstream along the leakage flowpath) which then joins the first face at the associated surface of the vane platform. An example dimension of the terminus 218 in cross-section is 0.5-2.0 millimeters.

In this example, a forward swirl generator is attached to a forward end of the platform and an aft swirl generator is attached to an aft end of the platform. The sealing system comprises a forward labyrinth seal system and an aft labyrinth seal system. The leakage flowpath passes sequentially past the aft swirl generator, then through the aft seal system then through the forward seal system and then past the forward swirl generator. When discussing orientations relative to the leakage flowpath, the terms “leading” and “trailing” will vary relative to the directions along the main gaspath itself. Thus, for example, the leading face of one of the seal lands may be an aft face; whereas, the leading edge of one of the airfoils is forward of the trailing edge of that airfoil.

The example seal lands are provided with a similar swirl generation feature at their leading faces 211 but not thereafter for the land 200B. This is because, particularly for the land 200B, such a feature may actually guide the air in a more leakage-encouraging direction away from the FIG. 1A intermediate segment 144. Nevertheless such a feature might be added to the generator 200B or to an unstepped counterpart. Thus, the example configuration provides six locations of swirl generation: two on each of the seal generators; and one on each of the seal lands. FIG. 1B schematically shows swirl generation at the flow along the faces numbered 640, 642, 644, 646, 648, 649, 650. FIG. 1B also shows recirculation zones/induced vortices 660, 664, and 666.

Thus, the flow along the leakage flowpath 620 sequentially encounters the swirl inducing concavities: first, the forward and radially outward concavity of the face 214 of the discourager/swirl generator 204, then the aftward and radially outward concavity of its face 212; then the aftward and radially outward concavity of the face 214 of the aft land 200B; then the similar concavity of the forward land 200A; then the aftward and radially inward concavity of the ID face of the forward land 200A; then the aftward and radially inward concavity of the face 214 of the discourager/swirl generator 202; and finally the forward and radially inward concavity of the face 212 of the discourager/swirl generator 202.

Example manufacture techniques and materials for the basic vane segments may be as otherwise conventional in the art. Additionally, example manufacture involves securing the swirl generator segments to associated vane segments before assembly or reassembly of the vane segments to each other. As is discussed below, this gives rise to a variety of retrofit options. The swirl generator segments may initially be extruded over-size in cross-section. For example, the cross-section may correspond to an overall quadrilateral that includes the ramps/projections or is yet slightly further oversized. The extruded elastomer may be cut into segments and have adhesive applied to the mounting face and may then be secured to the associated surface of the segment platform. Due to the arcuate nature of the platform segment, this may involve a slight bending/flexing of the swirl generator segment.

Example adhesives are room temperature vulcanizing (RTV) silicone adhesive or polyimide film adhesive.

Once adhered to the platform segment, the final cross-sectional shape of the swirl generator may be machined in place such as via diamond abrasive bit grinding. This may be numerically controlled via machine working off a reference datum on the stator segment so as to assure precise positioning. Such precise positioning is particularly relevant for the inner diameter seal-integrated swirl generators for which precise positional tolerances relative to the rotor edges are desired. Because it may be undesirable for the abrasive bit to remove any platform material, the grinding may leave a concave fillet 230 of the swirl generator material (FIG. 1C) projecting out along the surface of the platform. To the extent a pre-shaped swirl generator is used (e.g., one extruded in the essential final cross-section) such fillet may be more likely to be avoided.

Either the cutting of the extrusion or the subsequent machining may leave the swirl generators with circumferential length slightly less than that which would ultimately account for a full 360° assembly. This may thus leave slight circumferential gaps between adjacent ends of corresponding swirl generator segments of adjacent vanes. Such gaps may allow for some relative expansion and contraction of the vanes or relative movements of vanes due to differential thermal expansion relative to supporting case structure or due to mechanical loading.

In the case of metallic vane segments (e.g., titanium alloy) similar swirl generator materials and manufacture and assembly techniques may be used. Additionally, it may be relatively more likely that mechanical fasteners are used due to easier ability to interface with machined features such as holes in metal. For example, metallic or non-metallic rivets may have a more robust engagement with holes in a metal platform than with holes in a composite platform. With fiber composites, hole drilling may raise issues of removing protective coating from composites exposing fiber layering to delamination-inducing wear.

The swirl generators may be installed in an original equipment manufacture (OEM) situation of an original engine. Additionally, they may be installed in a remanufacture situation for such an engine that previously had such swirl generators. For example, the engine may be disassembled and vane segments removed. Although new segments with swirl generators may be installed, removed vane segments may be remanufactured by a process such as blending of nicks, dents, and/or scratches restoring of erosion coating (e.g., brushing or spraying elastomeric coating). Additional cleaning and/or restoration of the basic composite vane segment may include preparation such as scrubbing with light abrasive (e.g., abrasive-bonded nonwoven polyimide fiber pad) or grit blasting prior to the blending. Thereafter, replacement swirl generators may be attached as in the OEM situation and the remanufactured segments reassembled in an engine (potentially the same engine they were removed from).

Yet alternatively, a remanufacture situation may involve an engine that did not previously have such swirl generators on the corresponding vane segments. This may involve replacing the prior vanes with new vanes or may involve adding swirl generators to existing vanes that had been on an engine while not having swirl generators. In such a retrofit situation, cleaning and preparation steps for the vane segments may be as discussed above.

Other variations involve unsegmented or differently-segmented stator stages. For example, there could be two 180° segments (with many more vanes) bolted to each other or, there could be a single continuous 360° component. Such variations include hybrids wherein the inner diameter (ID) platform box structure is separate from the vane airfoils and mounted thereto (e.g., via bolting). In such a hybrid situation, the vane airfoils may be singlets or may be clustered into doublets or greater joined at the outer diameter (OD) shroud or segment thereof. The hybrid's ID box section may be a continuous 360° component or a differently-segmented component such as the two 180° segments noted previously. In any of such situations, similar swirl generators may be similarly attached or attached in ways customized to the environment.

Figure 4:
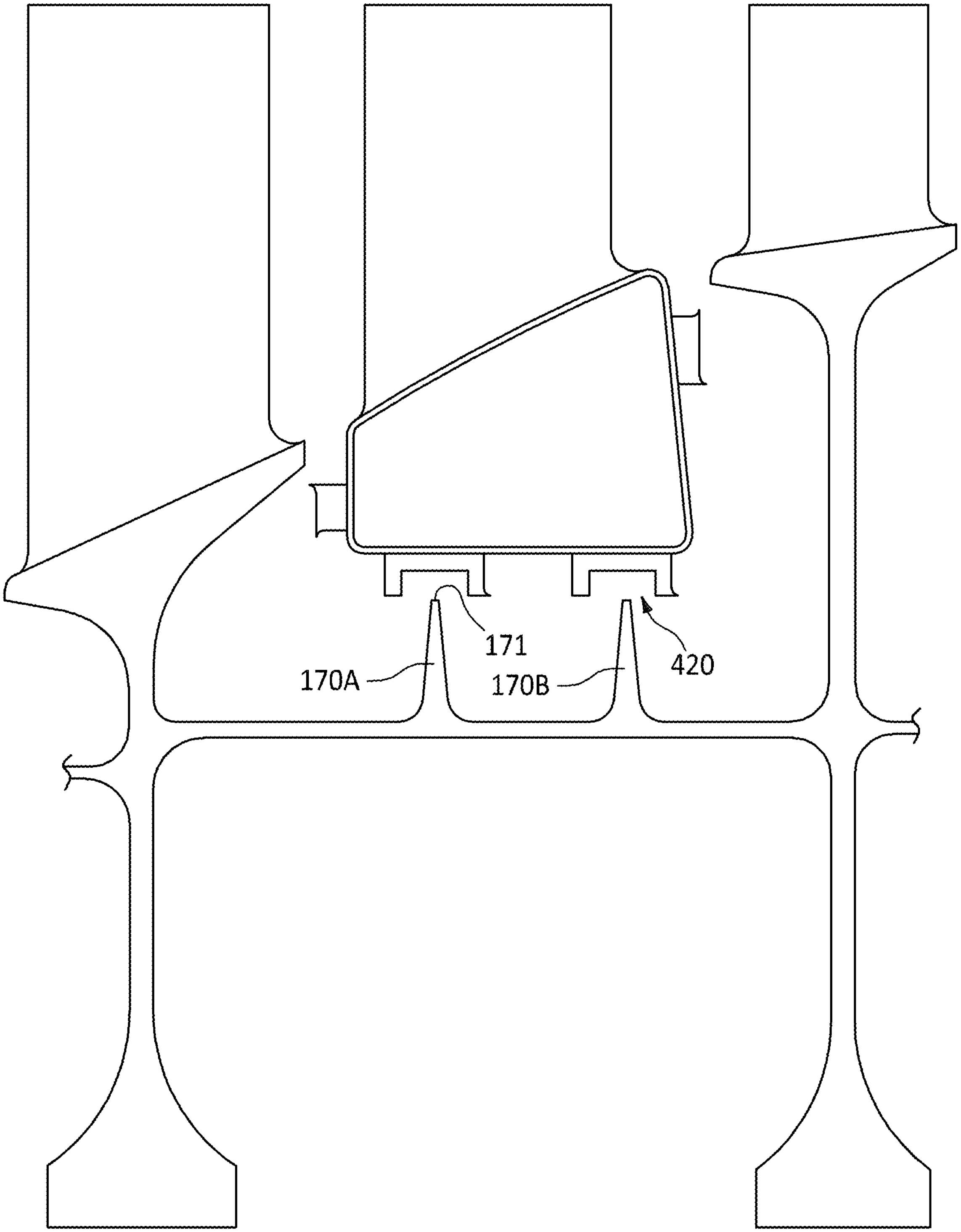
FIG. 4 is a partial central longitudinal sectional view of an alternate compressor section.

FIG. 4 shows an alternate platform cross-sectional shape lacking the inner diameter step. Additionally, the land inner diameter (ID) surfaces are preformed with grooves/channels 420 open radially inward to better accommodate the plates/knife edges 170A, 170B during operation. During operation, centrifugal loading may radially expand the rotor at the plates/knife edges causing the tips 171 of the plates/knife edges to shift radially outward to be accommodated within the channels or grooves 420.

Component materials and manufacture techniques and assembly techniques may be otherwise conventional.

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

One or more embodiments have been described. Nevertheless, it will be understood that various modifications may be made. For example, when applied to an existing baseline configuration, details of such baseline may influence details of particular implementations. Accordingly, other embodiments are within the scope of the following claims.

What is claimed is:

1. A gas turbine engine comprising:

a rotor having a first blade stage and a second blade stage each having a disk;

a stator having a vane stage between the first blade stage and the second blade stage and having a platform; and a sealing system having a stator section and a rotor section, wherein:

the platform has an outer diameter (OD) gaspath surface from which airfoils of the vane stage extend, a forward end, an aft end, and an inner diameter (ID) surface;

the sealing system rotor section comprises one or more radially outwardly protruding features on the rotor section;

the sealing system stator section comprises one or more lands mounted to the platform inner diameter surface;

each of the lands have an outer diameter (OD) surface mounted to the platform and an aft surface; and each land aft surface has a concavity leading radially inward to an aftward protrusion spaced from the platform ID surface.

2. The gas turbine engine of claim 1 wherein:

each land is an elastomer.

3. The gas turbine engine of claim 1 wherein:

the aftward protrusion protrudes by at least 1.0 millimeter; and/or the concavity has a radius of curvature of at least 1.0 millimeter.

4. The gas turbine engine of claim 1 wherein:

the stator vane stage is segmented with a plurality of segments; and each stator vane stage segment has an associated segment of the platform, an associated segment of a shroud, and at least one airfoil extending between the platform segment and the shroud segment.

5. The gas turbine engine of claim 4 wherein:

each land comprises a plurality of segments respectively mounted to the platform segments.

6. The gas turbine engine of claim 1 wherein:

each land has a pre-formed groove axially spanning the associated radially-protruding features.

7. The gas turbine engine of claim 1 further comprising at least one of:

a forward swirl generator mounted to a forward end of the platform; and an aft swirl generator mounted to an aft end of the platform.

8. A method for manufacturing the gas turbine engine of claim 1, the method comprising:

adhering the lands to the platform.

9. The method of claim 8 further comprising:

molding or extruding the lands or precursors of said lands.

10. The method of claim 9 comprising said extruding wherein:

the precursors are extruded in a quadrilateral cross-section and the concavity is machined after securing the precursors.

11. A method for using the gas turbine engine of claim 1, the method comprising:

rotating the rotor relative to the stator to drive flow in a downstream direction from the first blade stage to the second blade stage; and a leakage flow passing radially inward between the platform and the second blade stage and then forward to be deflected by the land aft concavity to cause turbulence.

12. The method of claim 11 wherein:

the aft concavity reduces a rate of the leakage flow relative to an absence of the concavity.

13. A gas turbine engine stator stage comprising:

a plurality of vane segments each having:

an inner diameter platform;

an outer diameter shroud; and one or more airfoils extending between the platform and shroud; and wherein:

the platforms each have an axially forward end and an axially aft end;

the platforms each have a first circumferential end section and a second circumferential end section;

the second end sections are received in the first end sections of adjacent platforms; and at least one of:

a) a forward swirler is mounted to the platform forward end and has a first face facing the forward end, a second face spaced forwardly of the first face, an inner diameter (ID face) and an outer diameter (OD) face, the second face having a forward and radially inward concavity;

b) a forward swirler is mounted to the platform forward end and has a first face facing the forward end, a second face spaced forwardly of the first face, an inner diameter (ID face) and an outer diameter (OD) face, the ID face having a rearward and radially inward concavity;

c) an aft swirler is mounted to the platform aft end and has a first face facing the aft end and second face spaced aft of the first face, an inner diameter (ID face) and an outer diameter (OD) face, the OD face having a forward and radially outward concavity;

d) an aft swirler is mounted to the platform aft end and has a first face facing the aft end and second face spaced aft of the first face, an inner diameter (ID face) and an outer diameter (OD) face, the second face having a rearward and radially outward concavity; and e) an inner diameter (ID) swirler is formed as a seal land mounted to an inner diameter (ID) surface of the platform and has a first face facing the inner ID surface of the platform and second face spaced radially inward of the first face, an aft face, and a forward face, the aft face having an aftward and radially outward concavity.

14. The gas turbine engine stator stage of claim 13 wherein:

said at least one of a forward swirler, an aft swirler, and an inner diameter (ID) swirler is adhered to the platform; and the platform is a fiber-reinforced composite.

15. The gas turbine engine stator stage of claim 14 wherein:

the forward swirler has both said associated second face forward and radially inward concavity and ID face rearward and radially inward concavity; and the aft swirler has both said associated OD face forward and radially outward concavity and the second face rearward and radially outward concavity.

16. A method for using the gas turbine engine stator stage of claim 13, the method comprising:

rotating the rotor relative to a stator to drive flow in a downstream direction from a first blade stage to a second blade stage; and a leakage flow passing radially inward between the platforms and the second blade stage and then forward to be deflected by at least one said concavity to cause turbulence.

17. A gas turbine engine stator stage comprising:

an inner diameter platform;

an outer diameter shroud; and a plurality of airfoils extending between the platform and shroud; and wherein:

the platform has an axially forward end and an axially aft end and an inner diameter (ID) surface; and at least one of the platform forward end, aft end, and inner diameter (ID) surface bears means for inducing swirl in a leakage flow passing radially inward behind the aft end and forward and then radially outward past the forward end.

18. The gas turbine engine stator stage of claim 17 comprising said means on each of the platform forward end, aft end, and inner diameter (ID) surface.

19. The gas turbine engine stator stage of claim 17 comprising said means on the platform inner diameter (ID) surface and wherein the means are integrated with a seal land.

20. The gas turbine engine stator stage of claim 17 wherein said means comprises a circumferential array of segments secured to a substrate of the platform.

* * * * *